(12) United States Patent
Buslepp et al.

(10) Patent No.: US 7,568,467 B2
(45) Date of Patent: Aug. 4, 2009

(54) CRANK POSITION CORRECTION USING CYLINDER PRESSURE

(75) Inventors: Kenneth J. Buslepp, Brighton, MI (US); Douglas R. Verner, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 242 days.

(21) Appl. No.: 11/759,263

(22) Filed: Jun. 7, 2007

(65) Prior Publication Data

US 2008/0229814 A1 Sep. 25, 2008

Related U.S. Application Data

(60) Provisional application No. 60/919,955, filed on Mar. 23, 2007.

(51) Int. Cl.
*F02M 7/00* (2006.01)
*G06F 19/00* (2006.01)

(52) U.S. Cl. .................. 123/435; 123/406.22; 701/114; 73/114.16

(58) Field of Classification Search .................. 123/434, 123/435, 673, 406.22, 406.41; 701/114, 701/115; 73/114.16
See application file for complete search history.

(56) References Cited

U.S. PATENT DOCUMENTS

| | | | | |
|---|---|---|---|---|
| 6,564,785 B2* | 5/2003 | Iwasaki | ................. | 123/568.21 |
| 7,117,082 B2* | 10/2006 | Kohira et al. | ............... | 701/114 |
| 7,167,793 B1* | 1/2007 | Gibson et al. | ............... | 701/114 |
| 2002/0189595 A1* | 12/2002 | Iwasaki | ..................... | 123/491 |
| 2005/0274358 A1* | 12/2005 | Kohira et al. | .......... | 123/406.22 |

* cited by examiner

*Primary Examiner*—John T Kwon

(57) ABSTRACT

A method of correcting a crankshaft position may include determining first, second, and third crankshaft positions, determining first, second, and third cylinder pressures, determining first, second, and third cylinder volumes, determining the logarithm of the first, second, and third cylinder pressures and cylinder volumes, and determining a relationship between the third cylinder volume and the first and second cylinder volumes. The first, second, and third crankshaft positions may be provided during one of a piston expansion stroke and a piston compression stroke within a cylinder. The logarithm of the third cylinder pressure and cylinder volume may be evaluated with respect to a predetermined limit of a line defined by the logarithm of the first and second cylinder pressures and first and second cylinder volumes.

20 Claims, 4 Drawing Sheets

CRANK POSITION CORRECTION USING CYLINDER PRESSURE

This application claims the benefit of U.S. Provisional Application No. 60/919,955, filed on Mar. 23, 2007. The disclosure of the above application is incorporated herein by reference.

FIELD

The present disclosure relates to engine systems, and more specifically to systems and methods for evaluating a crankshaft position.

BACKGROUND

The statements in this section merely provide background information related to the present disclosure and may not constitute prior art.

Some vehicles include an internal combustion engine that generates drive torque. More specifically, the engine draws in air and mixes the air with fuel to form a combustion mixture. The combustion mixture is compressed and ignited to drive pistons that are disposed within the cylinders. The pistons drive a crankshaft that transfers drive torque rotationally to a transmission and wheels.

A crankshaft position signal is generated based on the rotation of the crankshaft. A control module determines an engine position and an engine speed from the crankshaft signal. Engine position and engine speed are used to control one or more subsystems within the vehicle. Errors in the crankshaft signal can cause inaccurate engine speed and engine position computations and therefore may cause one or more vehicle subsystems to operate inefficiently.

SUMMARY

Accordingly, a method of correcting a crankshaft position may include determining first, second, and third crankshaft positions, determining first, second, and third cylinder pressures, determining first, second, and third cylinder volumes, determining the logarithm of the first, second, and third cylinder pressures and cylinder volumes, and determining a relationship between the third cylinder volume and the first and second cylinder volumes. The first, second, and third crankshaft positions may be determined during one of a piston expansion stroke and a piston compression stroke within a cylinder. Determining the relationship between the third cylinder volume and the first and second cylinder volumes may include determining a point defined by the logarithm of the third cylinder pressure and the logarithm of the third cylinder volume. The point may be evaluated with respect to a predetermined limit of a line defined by the logarithm of the first cylinder pressure and the logarithm of the first cylinder volume as well as the logarithm of the second cylinder pressure and the logarithm of the second cylinder volume.

Alternatively or additionally, the method may include calculating a first slope and a y-intercept of a line passing through a first point defined by the logarithm of the first cylinder volume and the logarithm of the first cylinder pressure and a second point defined by the logarithm of the second cylinder volume and the logarithm of the second cylinder pressure and calculating a second slope based on the logarithm of the third cylinder pressure, the logarithm of the third cylinder volume, and the y-intercept of the line.

A control module according to the present disclosure may include a crankshaft position determination module, a cylinder pressure determination module a cylinder volume determination module, and a crankshaft position error determination module. The crankshaft position determination module may be configured to determine first, second, and third crankshaft positions in an engine during one of a piston expansion stroke and a piston compression stroke within a cylinder. The cylinder pressure determination module may be configured to determine first, second, and third cylinder pressures corresponding to the first, second, and third crankshaft positions. The cylinder volume determination module may be in communication with the crankshaft position determination module and may be configured to determine first, second, and third cylinder volumes corresponding to the first, second, and third crankshaft positions. The crankshaft position error determination module may be in communication with the cylinder pressure determination module and the cylinder volume determination module and may be configured to determine whether a point defined by the logarithm of the third cylinder pressure and the logarithm of the third cylinder volume is within a predetermined limit of a line defined by the logarithm of the first cylinder pressure and the logarithm of the first cylinder volume as well as the logarithm of the second cylinder pressure and the logarithm of the second cylinder volume.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
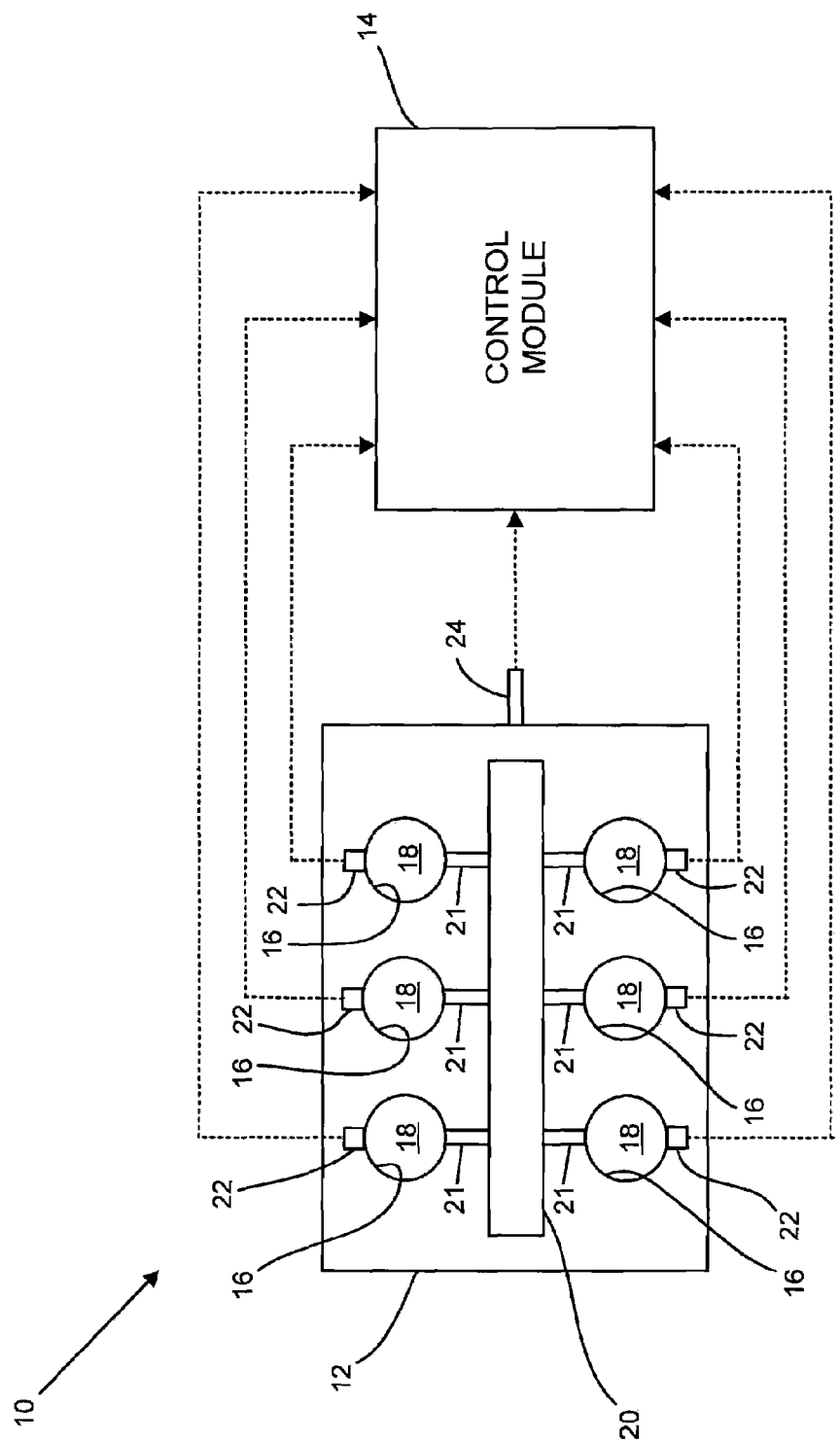
FIG. 1 is a schematic illustration of vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring to FIG. 1, an exemplary vehicle 10 is schematically illustrated. Vehicle 10 may include an engine 12 and a control module 14. Engine 12 may be a spark ignition internal combustion engine or a diesel engine and may include a plurality of cylinders 16 having a plurality of pistons 18 disposed for reciprocating motion therein and drivingly engaged with a crankshaft 20 by a series of connecting rods 21.

Cylinder pressure sensors 22 may be in communication with cylinders 16 and may measure pressures within cylinders 16. Cylinder pressure sensors 22 may be in communication with control module 14. While each cylinder 16 is shown having a cylinder pressure sensor 22 in communication therewith, it is understood that a single one of cylinders 16 may have cylinder pressure sensor 22 in communication therewith and the remainder of cylinders 16 may not, as discussed below. For simplicity, the discussion below will relate to a single cylinder 16 and cylinder pressure sensor 22.

Cylinder pressure sensor 22 may provide a signal indicative of cylinder pressure to control module 14 at predetermined times. A crankshaft position sensor 24 may be in communication with control module 14 and may provide a signal indicative of the position of crankshaft 20. The crankshaft position signal may include a value indicative of a degree of crankshaft 20 rotation relative to a reference point.

Figure 2:
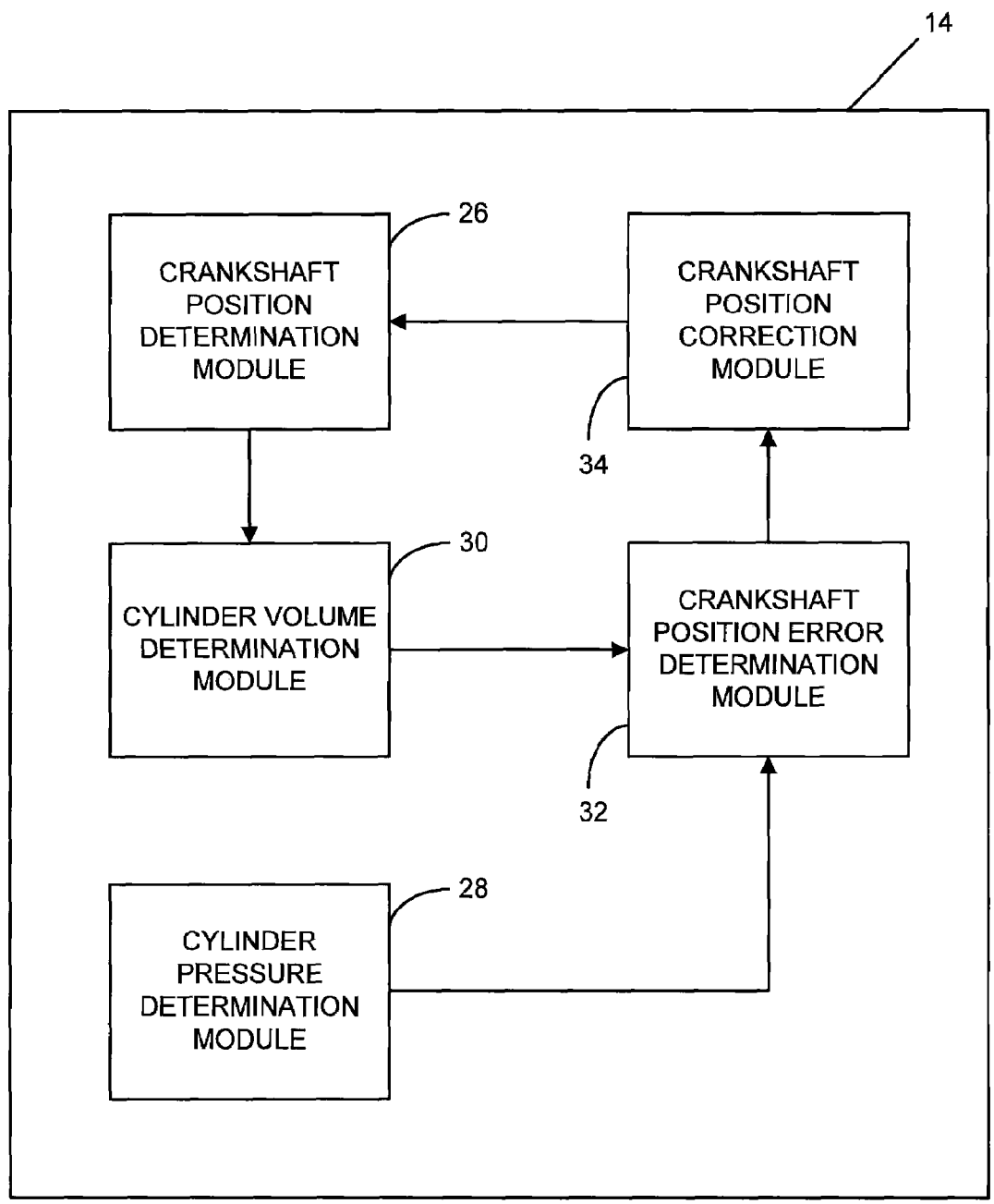
FIG. 2 is a functional block diagram of the control module shown in FIG. 1.

With reference to FIG. 2, control module 14 may include a crankshaft position determination module 26, a cylinder pressure determination module 28, a cylinder volume determination module 30, a crankshaft position error determination module 32, and a crankshaft position correction module 34. Crankshaft position determination module 26 may be in communication with cylinder volume determination module 30. Crankshaft position determination module 26 may determine a crankshaft position based on the crankshaft position signal provided by crankshaft position sensor 24. Crankshaft position determination module 26 may provide a signal indicative of the determined position of crankshaft 20 to cylinder volume determination module 30.

Cylinder volume determination module 30 may be in communication with crankshaft position error determination module 32. cylinder volume determination module 30 may determine a position of piston 18 within cylinder 16 based on the crankshaft position signal provided by crankshaft position determination module 26. Cylinder volume determination module 30 may calculate a volume of piston 18 within cylinder 16. Cylinder volume determination module 30 may provide a signal indicative of the calculated cylinder volume to crankshaft position error determination module 32.

Cylinder pressure determination module 28 may be in communication with crankshaft position error determination module 32. Cylinder pressure determination module 28 may determine a cylinder pressure within cylinder 16 based on the cylinder pressure signal provided by cylinder pressure sensor 22. Cylinder pressure determination module 28 may provide a signal indicative of the determined cylinder pressure to crankshaft position error determination module 32.

Crankshaft position error determination module 32 may be in communication with crankshaft position correction module 34. Crankshaft position error determination module 32 may determine an error in the determined position of crankshaft 20 from crankshaft position determination module 26. More specifically, crankshaft position error determination module 32 may determine an error in the determined position of crankshaft 20 based on the signal indicative of the calculated cylinder volume from cylinder volume determination module 30 and the signal indicative of the determined cylinder pressure from cylinder pressure determination module 28. Crankshaft position error determination module 32 may provide a signal indicative of the determined crankshaft position error to crankshaft position correction module 34.

Crankshaft position correction module 34 may be in communication with crankshaft position determination module 26. Crankshaft position correction module 34 may determine a crankshaft position correction value based on the signal indicative of the determined crankshaft position error from crankshaft position error determination module 32. Crankshaft position correction module 34 may provide a signal indicative of the determined crankshaft position correction value to crankshaft position determination module 26.

Figure 3:
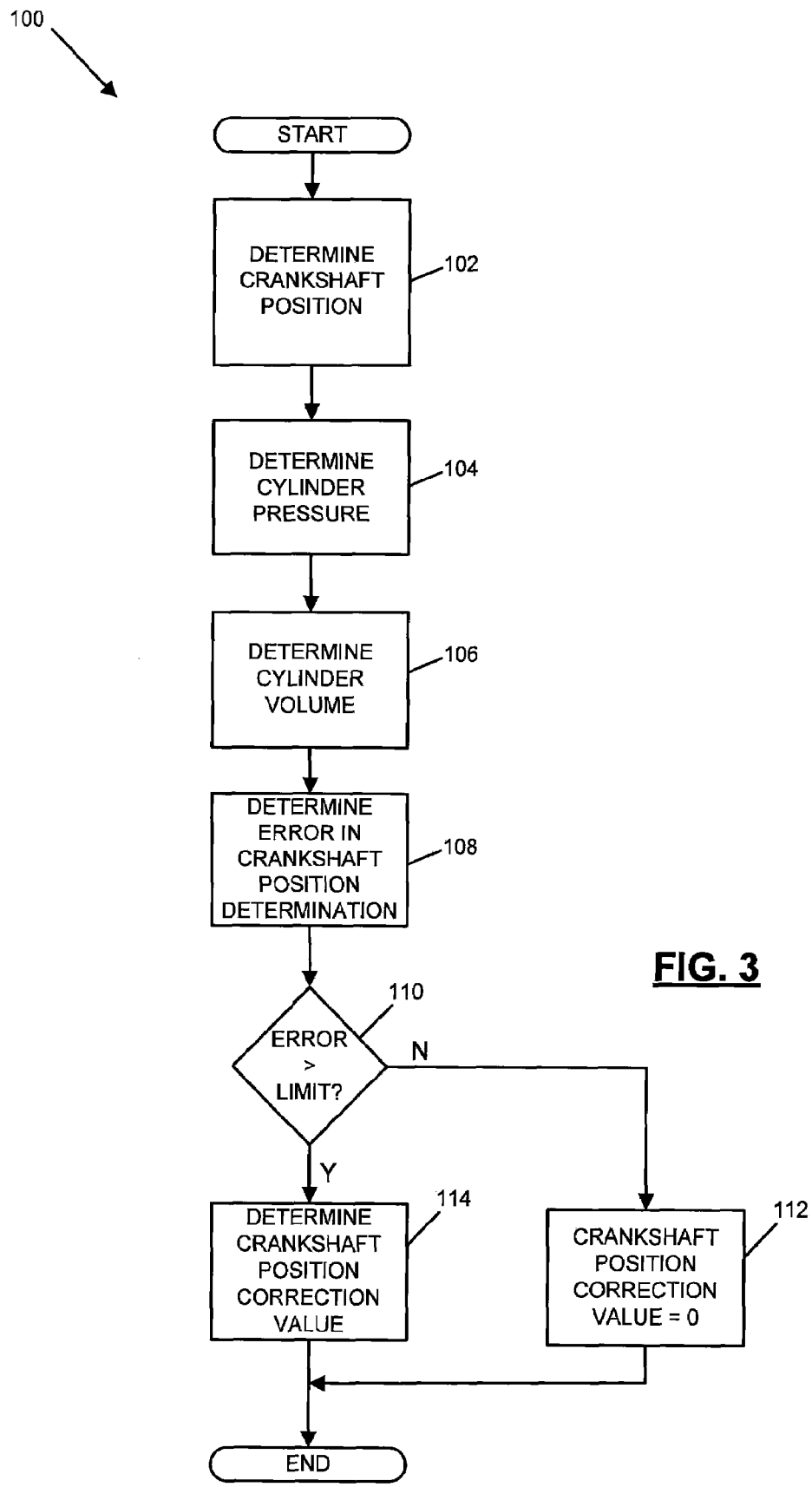
FIG. 3 is a flow chart illustrating a method of determining crankshaft position error according to the present disclosure.

With reference to FIG. 3, a control logic 100 for correcting a determined crankshaft position is illustrated. Control logic 100 may loop throughout operation of engine 12. Control logic 100 may begin at determination block 102 where crankshaft position is determined. Determination block 102 may determine first, second, and third crankshaft positions ($C1_{det}$, $C2_{det}$, $C3_{det}$) corresponding to first, second, and third times (t1, t2, t3) during either a compression stroke before the firing of cylinder 16 or an expansion stroke after fuel has been burned in cylinder 16. Crankshaft position may be determined in degrees of rotation of crankshaft 20 relative to a reference point. For example, rotation of crankshaft 20 may be indexed relative to a position of piston 18 within cylinder 16, as discussed below.

The first, second, and third crankshaft positions ($C1_{det}$, $C2_{det}$, $C3_{det}$) determined at determination block 102 may be first, second, and third measured crankshaft positions ($C1_{meas}$, $C2_{meas}$, $C3_{meas}$) from crankshaft position sensor 24 at times t1, t2, t3 plus a crankshaft position correction value (CORR) determined from a previous iteration of control logic 100 ($C1_{det}$=$C1_{meas}$+CORR, $C2_{det}$=$C2_{meas}$+CORR, $C3_{det}$=$C3_{meas}$+CORR). By default, the crankshaft position correction value may be set to zero for an initial iteration of control logic 100. Control logic 100 may then proceed to determination block 104 where cylinder pressure is determined Determination block 104 may determine cylinder pressures (P1, P2, P3) corresponding to times t1, t2, t3. Cylinder pressures (P1, P2, P3) may be determined by a cylinder pressure measurement from cylinder pressure sensor 22. Control logic 100 may then proceed to determination block 106.

Determination block 106 may calculate first, second, and third cylinder volumes (V1, V2, V3) corresponding to the first, second, and third determined crankshaft positions ($C1_{det}$, $C2_{det}$, $C3_{det}$). As discussed above, the position of piston 18 within cylinder 16 may be known based on the position of crankshaft 20. More specifically, an initial reference position of crankshaft 20 may correspond to a given position of piston 18 with cylinder 16. Therefore, during operation of engine 12, the position of piston 18 may be known at any given time based on a measured crankshaft position relative to the initial reference point. Cylinder volume may be calculated based on the position of piston 18 within cylinder 16.

Cylinder volume may be calculated relative to one of top dead center (TDC) and bottom dead center (BDC). TDC may be an uppermost position of piston 18 within cylinder 16 and BDC may be a lowermost position of piston 18 within cylinder 16. TDC may correspond to a starting point of an expansion stroke of piston 18 and BDC may correspond to a starting point of a compression stroke of piston 18. An additional cylinder volume (squish volume) may be located above piston 18 in cylinder 16 at TDC. Cylinder volume may be calculated during an expansion stroke of piston 18 by determining the volume of cylinder 16 between a current position of piston 18 and TDC plus the squish volume. Cylinder volume may be calculated during a compression stroke of piston 18 by determining the volume of cylinder 16 between a current position of piston 18 and BDC plus the squish volume. Control logic 100 may then proceed to determination block 108.

Determination block 108 may determine an error in the determined crankshaft position from determination block 102. Determination block 108 may determine the logarithms of P1, P2, P3 and V1, V2, V3. A line may be generated by the logarithms of P1, P2 and V1, V2. A first slope (m1) and y-intercept (b) of the line may be determined by solving the equations log(P1)=(m1)(log(V1))+b and log(P2)=(m1)(log(V2))+b. The logarithms of P3 and V3 and the previously determined y-intercept may then be used to determine whether the logarithms of P3 and V3 are on the line. More specifically, the equation m2=(log(P3)−b)/log(V3) may be used to determine a second slope (m2). The difference between the first and second slopes (Δm=m1−m2) may be used to determine the error in determined crankshaft position from determination block 102.

Figure 4:
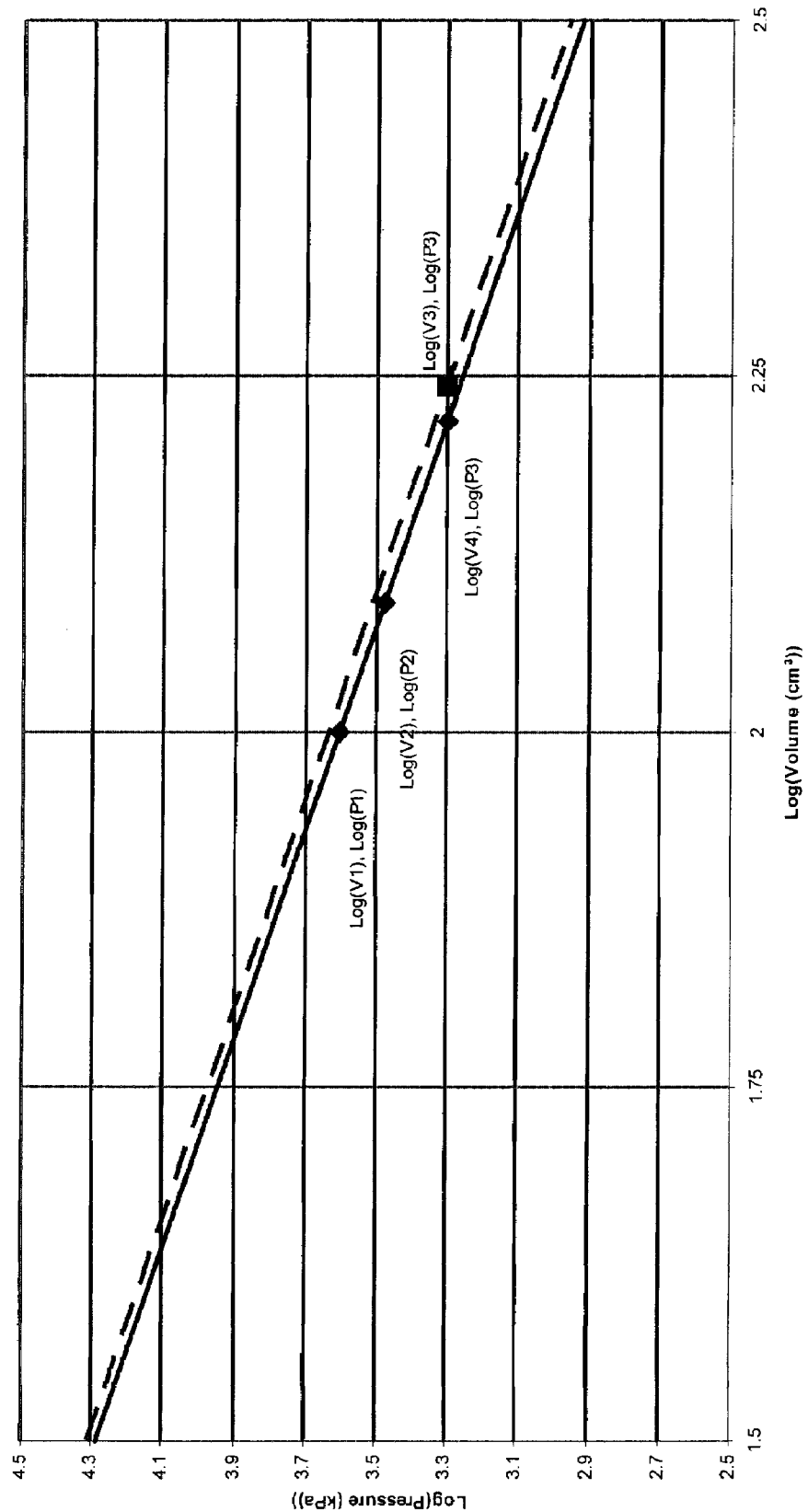
FIG. 4 is a graphical representation of the relationship between cylinder volume and cylinder pressure according to the present disclosure.

The difference (Δm) in slopes may be used as the error value. The error value is a function of crankshaft position error since the volumes V1, V2, V3 are determined based on the determined crankshaft position. Therefore, the error value may be converted into a difference in crankshaft position as well. More specifically, crankshaft position error may be calculated from the error value. Control logic 100 then proceeds to decision block 110. Alternatively, crankshaft position error may be determined by determining the difference between the log(V3) and the logarithm of a fourth volume (log(V4)) on the line corresponding the log(P3), as seen in FIG. 4 and discussed below. As indicated below, log(V4) may generally correspond to a calculated log(V3). The difference may be converted to a crankshaft position based on the relationship between cylinder volume and crankshaft position.

Decision block 110 evaluates whether the error value exceeds a predetermined limit. If the error value is less than or equal to the limit, then control logic 100 proceeds to control block 112, where a crankshaft position correction value is set to zero. Control logic 100 may then terminate for the given iteration. If the error value is greater than the predetermined limit, then control logic 100 proceeds to determination block 114.

Determination block 114 determines a crankshaft position correction value. The crankshaft position correction value may generally correspond to the error value determined at determination block 108, discussed above. As indicated above, the error value may be converted into a difference in crankshaft position since crankshaft position is used to determine volume, which is then used to determine the error value.

With reference to FIG. 4, an exemplary data set includes a first set of points corresponding to an expansion stroke of piston 18. Table 1 includes a first set of pressures corresponding to a first set of volumes. Table 2 includes the logarithms of the values in Table 1.

TABLE 1

| Volume (cm³) | | | Pressure (kPa) | | |
|---|---|---|---|---|---|
| V1 | V2 | V3 | P1 | P2 | P3 |
| 100 | 125 | 175 | 4000 | 3000 | 2000 |

TABLE 2

| Volume (cm³) | | | Pressure (kPa) | | |
|---|---|---|---|---|---|
| log(V1) | log(V2) | log(V3) | log(P1) | log(P2) | log(P3) |
| 2.000 | 2.091 | 2.243 | 3.602 | 3.477 | 3.301 |

The logarithms of two of the volumes (log(V1), log(V2)) and the logarithms of corresponding pressures (log(P1), log(P2)) are used to determine the equation of a line.

The logarithms are used to solve the equation of a line (y=mx+b), where:

$$3.602 = m_1(2.000) + b; \text{ and}$$

$$3.477 = m_1(2.091) + b.$$

Solving the system of equations yields $m_1 = -1.374$ and $b = 6.349$. The y-intercept (b) can then be used to determine if the third point (log(V3), log(P3)) is on the line. Solving for slope $m_2$ yields $m_2 = (y-b)/x$. Using the third point:

$$m_2 = (3.301 - 6.349)/2.243.$$

The value of $m_2$ is determined to be $-1.359$. The difference ($\Delta m = m_1 - m_2 = -0.015$) may then be compared to an error limit, as discussed above. The difference ($\Delta m$) may also be converted back to a crankshaft position value based on the relation to cylinder volume.

Alternatively and as indicated above, crankshaft position error may be determined by determining the difference between the log(V3) and the logarithm of a fourth volume (log(V4)). V4 is calculated from the line projected from the log(V1), log(P1) and log(V2), log(P2) and on the line corresponding with the log(P3). As such, V4 may generally be a calculated version of V3. As seen in FIG. 4, the difference between log(V3) and log(V4) is approximately log (0.024), which may be converted back to a crankshaft position value based on the relation to cylinder volume.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method, comprising:
    determining first, second, and third positions of a crankshaft in an engine during one of a piston expansion stroke and a piston compression stroke within a cylinder;
    determining first, second, and third cylinder pressures corresponding to the first, second, and third crankshaft positions;
    determining first, second, and third cylinder volumes corresponding to the first, second, and third crankshaft positions;
    determining the logarithm of the first, second, and third cylinder pressures and the first, second, and third cylinder volumes; and
    determining whether a point defined by the logarithm of the third cylinder pressure and the logarithm of the third cylinder volume is within a predetermined limit of a line defined by the logarithm of the first cylinder pressure and the logarithm of the first cylinder volume as well as the logarithm of the second cylinder pressure and the logarithm of the second cylinder volume.

2. The method of claim 1 further comprising determining a crankshaft position correction value when the logarithm of the third cylinder pressure and the logarithm of the third cylinder volume are outside of the predetermined limit.

3. The method of claim 2 wherein said determining a crankshaft position correction value includes determining a difference between the logarithm of the third cylinder volume and a logarithm of a fourth cylinder volume on the line corresponding to the logarithm of the third cylinder pressure.

4. The method of claim 3 wherein said determining a crankshaft position correction value includes determining a crankshaft position differential corresponding to the determined difference.

5. The method of claim 4 further comprising adjusting the determined crankshaft position during a subsequent iteration of said method based on the determined crankshaft position differential.

6. The method of claim 1 wherein said determining a first cylinder volume includes one of determining a cylinder volume between a bottom dead center piston position and a position corresponding to the first position of the crankshaft during the compression stroke of the piston and determining the cylinder volume between a top dead center piston position and a position corresponding to the first position of the crankshaft during the expansion stroke of the piston.

7. The method of claim 1 wherein the first position of the crankshaft is measured and the first cylinder pressure is measured, then the second position of the crankshaft is measured and the second cylinder pressure is measured, and then the third position of the crankshaft is measured and the third cylinder pressure is measured.

8. A method, comprising:
determining first, second, and third positions of a crankshaft in an engine during one of a piston expansion stroke and a piston compression stroke within a cylinder;
determining first, second, and third cylinder pressures corresponding to the first, second, and third crankshaft positions;
determining first, second, and third cylinder volumes corresponding to the first, second, and third crankshaft positions;
determining the logarithm of the first, second, and third cylinder pressures and the first, second, and third cylinder volumes; and
calculating a first slope and a y-intercept of a line passing through a first point defined by the logarithm of the first cylinder volume and the logarithm of the first cylinder pressure and a second point defined by the logarithm of the second cylinder volume and the logarithm of the second cylinder pressure and calculating a second slope based on the logarithm of the third cylinder pressure, the logarithm of the third cylinder volume, and the y-intercept of the line.

9. The method of claim 8 further comprising determining whether the second slope is within a predetermined limit of the first slope.

10. The method of claim 9 further comprising determining a crankshaft position correction value based on a difference between the first and second slopes when the second slope is outside of the predetermined limit.

11. The method of claim 10 wherein said determining a crankshaft position correction value includes determining a crankshaft position differential corresponding to the determined difference between the first and second slopes.

12. The method of claim 11 further comprising adjusting the determined crankshaft position during a subsequent iteration of said method based on the determined crankshaft position differential.

13. A control module, comprising:
a crankshaft position determination module that determines engine first, second, and third crankshaft positions in an engine during one of a piston expansion stroke and a piston compression stroke within a cylinder;
a cylinder pressure determination module that determines first, second, and third cylinder pressures corresponding to the first, second, and third crankshaft positions;
A cylinder volume determination module in communication with said crankshaft position determination module and that determines first, second, and third cylinder volumes corresponding to the first, second, and third crankshaft positions; and
a crankshaft position error determination module in communication with said cylinder pressure determination module and said cylinder volume determination module and that determines whether a point defined by the logarithm of the third cylinder pressure and the logarithm of the third cylinder volume is within a predetermined limit of a line defined by the logarithm of the first cylinder pressure and the logarithm of the first cylinder volume as well as the logarithm of the second cylinder pressure and the logarithm of the second cylinder volume.

14. The control module of claim 13 further comprising a crankshaft position correction module in communication with said crankshaft position error determination module, said crankshaft position error determination module determining an error in a determined crankshaft position, said crankshaft position correction module determining a crankshaft position correction value based on the determined error in the determined crankshaft position.

15. The control module of claim 14 wherein said crankshaft position correction module is in communication with said crankshaft position determination module, wherein said crankshaft position determination module determines the subsequent crankshaft positions based on a measured crankshaft position and the crankshaft position correction value.

16. The control module of claim 13 wherein said crankshaft position error determination module determines the crankshaft position error based on a difference between the logarithm of the third cylinder volume and a logarithm of a fourth cylinder volume on the line corresponding to the logarithm of the third cylinder pressure.

17. The control module of claim 13 wherein said crankshaft position error determination module calculates a first slope and a y-intercept corresponding to the line and to calculate a second slope based on the logarithm of the third cylinder pressure, the logarithm of the third cylinder volume, and the y-intercept of the line.

18. The control module of claim 17 wherein said crankshaft position error determination module compares said first and second slopes to one another.

19. The control module of claim 18 wherein said crankshaft position error determination module determines a difference between the first and second slopes.

20. The control module of claim 19 further comprising a crankshaft position correction module in communication with said crankshaft position error determination module to determine a crankshaft position correction value based on the difference between the first and second slopes.

* * * * *